(12) United States Patent
Konishi

(10) Patent No.: US 7,379,186 B2
(45) Date of Patent: May 27, 2008

(54) CHIRP INDICATOR OF ULTRASHORT OPTICAL PULSE

(75) Inventor: Tsuyoshi Konishi, Osaka (JP)

(73) Assignee: Osaka University, Osaka (JP)

( * ) Notice: Subject to any disclaimer, the term of this patent is extended or adjusted under 35 U.S.C. 154(b) by 155 days.

(21) Appl. No.: 11/447,974

(22) Filed: Jun. 7, 2006

(65) Prior Publication Data

US 2006/0279730 A1     Dec. 14, 2006

Related U.S. Application Data

(60) Provisional application No. 60/689,089, filed on Jun. 10, 2005.

(51) Int. Cl.
*G01B 9/021*     (2006.01)
*G01B 9/02*     (2006.01)

(52) U.S. Cl. ...................... 356/457; 356/450

(58) Field of Classification Search ............... 356/450, 356/457, 458
See application file for complete search history.

(56) References Cited

U.S. PATENT DOCUMENTS

| | | | | |
|---|---|---|---|---|
| 4,999,681 | A * | 3/1991 | Mader | 356/457 |
| 5,530,544 | A * | 6/1996 | Trebino et al. | 356/450 |
| 6,801,318 | B2 * | 10/2004 | Fu et al. | 356/450 |
| 7,130,052 | B1 * | 10/2006 | Kane | 356/450 |
| 7,230,715 | B2 * | 6/2007 | Li | 356/450 |

OTHER PUBLICATIONS

R. Trebino, et al., "*Measuring Ultrashort Laser Pulses in the Time-Frequency Domain Using Frequency-Resolved Optical Gating*", Rev. Sci. Instrum. 68(9), Sep. 1997, pp. 3277-3295.
C. Iaconis, I.A. Walmsely, "*Spectral Phase Interferometry for Direct Electric-Field Reconstruction of Ultrashort Optical Pulses*", Optics Letters, vol. 23, No. 10, May 15, 1998, pp. 792-794.
T. Konishi, Y. Ichioka, "*Optical Spectrogram Scope Using Time-to-Two-Dimensional Space Conversion and Interferometric Time-of-Flight Cross Correlation*", Optical Review, vol. 6, No. 6, (1999), pp. 507-512.

* cited by examiner

*Primary Examiner*—Michael A. Lyons
(74) *Attorney, Agent, or Firm*—Wenderoth, Lind & Ponack, L.L.P.

(57) ABSTRACT

There is provided a chirp indicator of ultrashort optical pulse in which a target ultrashort optical pulse is introduced into a spatial filter formed of a hologram in which is recorded information of chirp quantity of an ultrashort optical pulse used as a reference. The chirp indicator identifies the chirp quantity of the ultrashort optical pulse by detecting an optical correlation between the target ultrashort optical pulse and the ultrashort optical pulse used as a reference. Here, the ultrashort optical pulse to be detected is detected for each hologram, and depending on intensity of an amplitude of light emitted from each hologram, a composition ratio of chirp quantity corresponding to each hologram is deteremined. Then, based on the determined mixture ratio of the chirp quantity, chirp quantity of the ultrashort optical pulse to be detected is determined.

6 Claims, 15 Drawing Sheets

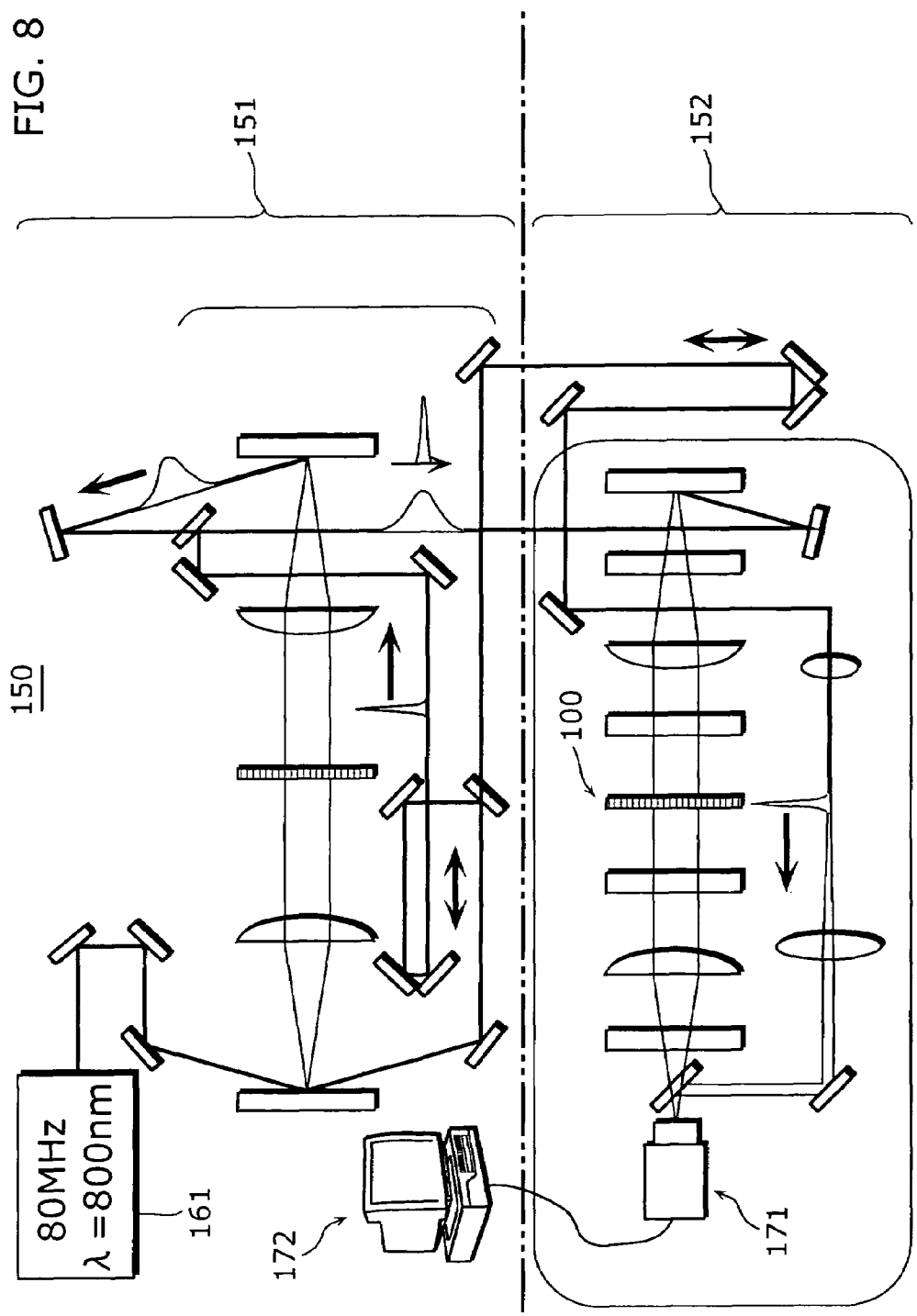

CHIRP INDICATOR OF ULTRASHORT OPTICAL PULSE

This application claims the benefit of U.S. Provisional Application No. 60/689,089, filed Jun. 10, 2005.

BACKGROUND OF THE INVENTION (1) Field of the Invention

The present invention relates to a chirp indicator of ultrashort optical pulse which measures the chirp quantity of an optical pulse, and particularly relates to a chirp indicator of ultrashort optical pulse which measures the chirp quantity of an ultrashort optical pulse by performing optical correlation processing using sample light recorded as a hologram.

(2) Description of the Related Art

Conventionally, a correlation measurement method for measuring an ultrashort optical pulse with a gate pulse used as a reference is widely known in measuring the chirp quantity of an ultrashort optical pulse in the femtosecond domain (for example, see R. Trebino, et al., Rev. Sci. Instrum., 68(9) pp. 3277-3295 (1997); C. Iaconis, I. A. Walmsley, Opt. Lett., 23 (10) pp. 792-794 (1998); and T. Konishi, Y. Ichioka, Opt. Rev., 6 (6) pp. 507-512 (1999)).

However, there is a problem with such a conventional correlation measurement method in that the ultrashort optical pulse that is generally used as the reference cannot always be obtained. Moreover, when simply isolating a chirp, there is no need to perform detailed waveform measurement; matching processing is sufficient. However, realizing a reference to be used in matching processing in the time domain is difficult.

SUMMARY OF THE INVENTION

A goal of the present invention is to solve the abovementioned problems by providing a chirp indicator of ultrashort optical pulse capable of measuring a chirp quantity of an ultrashort optical pulse through optical correlation processing.

To achieve the abovementioned goal, a chirp indicator of ultrashort optical pulse according to the present invention is (a) a chirp: indicator of ultrashort optical pulse that measures chirp quantity of an ultrashort optical pulse, and includes (a1) a spatial filter in which a hologram is formed, the hologram having information of chirp quantity of an ultrashort optical pulse used as a reference recorded, and (a2) a chirp quantity determination unit that determines a chirp quantity of a target ultrashort optical pulse by detecting an optical correlation between the target ultrashort optical pulse and the ultrashort optical pulse used as a reference when the target ultrashort optical pulse is introduced into the spatial filter.

Furthermore, (b) the information of chirp quantity of the ultrashort optical pulse used as a reference may be pattern information calculated so that a ratio of the correlation peak detected by the chirp quantity isolation unit to a crosstalk peak is a maximum, and the pattern information may be recorded as the hologram in the spatial filter.

Furthermore, (c) the pattern information may be determined, using an optimization algorithm, in the following manner: modulating the phase so that a sharp peak is detected by the chirp quantity isolation unit in the case where the target ultrashort optical pulse is the ultrashort optical pulse used as a reference; and modulating the phase so that a sharp peak is not detected by the chirp quantity isolation unit in the case where the target ultrashort optical pulse is not the ultrashort optical pulse used as a reference.

Furthermore, (d) a plurality of units of pattern information with differing chirp quantities may each be recorded as holograms in the spatial filter, and the chirp quantity isolation unit may detect a chirp in the target ultrashort optical pulse for each unit of the pattern information and determine the chirp quantity of the target ultrashort optical pulse based on a composition ratio of each detected chirp.

Furthermore, (e) a plurality of holograms may be formed in parallel in the spatial filter, and the chirp quantity isolation unit may isolate the chirp quantity of target ultrashort optical pulses in parallel by detecting an optical correlation between the target ultrashort optical pulses and the ultrashort optical pulse used as a reference when the target ultrashort optical pulses are introduced into said spatial filter in parallel.

Note that the present invention may be realized not only as a chirp indicator of ultrashort optical pulse, but also as a measurement method used in the chirp indicator for measuring chirp quantity of an ultrashort optical pulse.

According to the present invention, information of the amplitude/phase of the ultrashort optical pulse to be used as a reference is recorded as a hologram. Furthermore, such hologram is formed in a spatial filter, and such spatial filter is used as a standard for measuring the chirp quantity. Therefore, it is possible to consistently obtain the ultrashort optical pulse used as the reference.

Furthermore, the chirp quantity of the ultrashort optical pulse is measured by introducing the target ultrashort optical pulse into the spatial filter and performing processing which detects the optical correlation between the target ultrashort optical pulse and the ultrashort optical pulse used as the reference. Accordingly, the chirp quantity of the ultrashort optical pulse can be measured with the pulse still in light form, without converting the light to electricity; therefore, a drop in throughput can be suppressed.

Furthermore, the spatial filter is formed by arranging a plurality of holograms in an array shape. Thus, the chirp quantity of the ultrashort optical pulse can be measured over a plurality of ranges. In addition, when measuring a nonlinear chirped pulse, it is possible to carry out measurement using a combination of holograms with differing characteristics.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 8 is a diagram showing a configuration of an experimental optical system for testing a spatial filter;

DESCRIPTION OF THE PREFERRED EMBODIMENT

Figure 1:
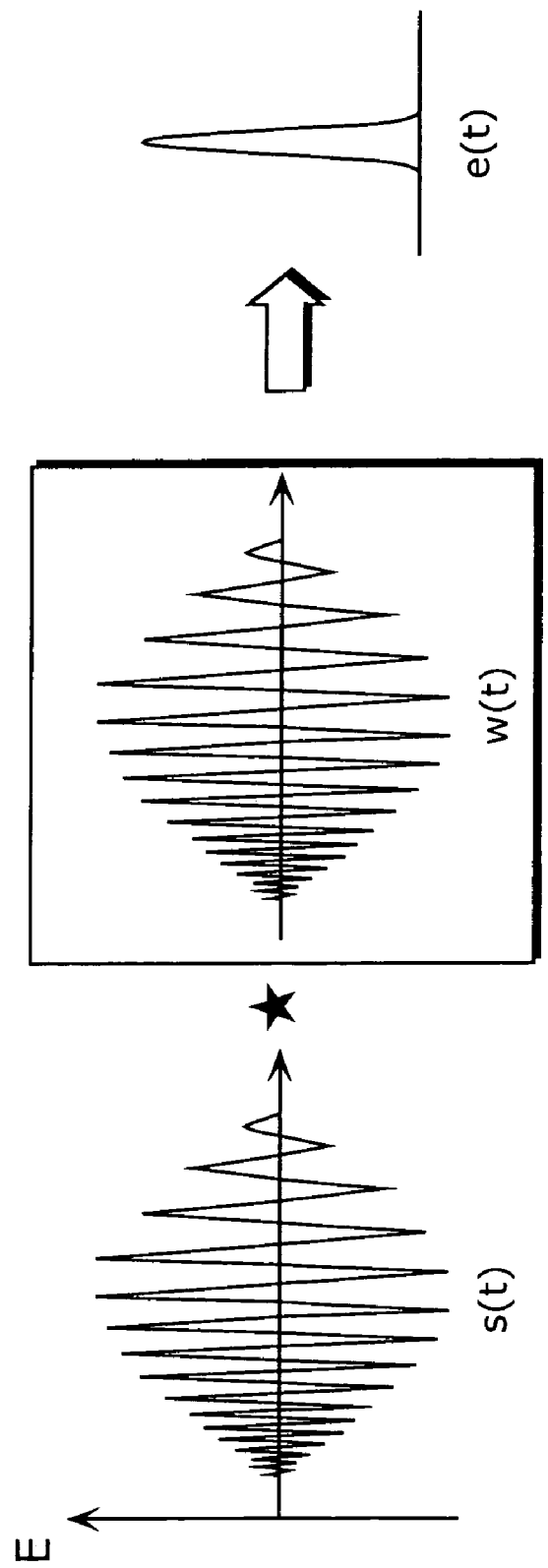
FIG. 1 is a diagram showing a fundamental principle of a chirp detection method.

Hereafter, a preferred embodiment of the present invention shall be described with reference to the diagrams.

A chirp indicator of ultrashort optical pulse according to the present embodiment includes the characteristics described in (a) through (e), below.

The chirp indicator of ultrashort optical pulse is (a) a chirp indicator of ultrashort optical pulse that measures chirp quantity of an ultrashort optical pulse, and includes (a1) a spatial filter in which a hologram is formed, the hologram having information of chirp quantity of an ultrashort optical pulse used as a reference recorded, and (a2) a chirp quantity determination unit that determines a chirp quantity of a target ultrashort optical pulse by detecting an optical correlation between the target ultrashort optical pulse and the ultrashort optical pulse used as a reference when the target ultrashort optical pulse is introduced into the spatial filter.

(b) The information of chirp quantity of the ultrashort optical pulse used as a reference is pattern information calculated so that a ratio of the correlation peak detected by the chirp quantity isolation unit to a crosstalk peak is a maximum, and the pattern information may be recorded as the hologram in the spatial filter.

(c) The pattern information is determined, using an optimization algorithm, in the following manner: modulating the phase so that a sharp peak is detected by the chirp quantity isolation unit in the case where the target ultrashort optical pulse is the ultrashort optical pulse used as a reference; and modulating the phase so that a sharp peak is not detected by the chirp quantity isolation unit in the case where the target ultrashort optical pulse is not the ultrashort optical pulse used as a reference.

(d) A plurality of units of pattern information with differing chirp quantities are each recorded as holograms in the spatial filter, and the chirp quantity isolation unit may detect a chirp in the target ultrashort optical pulse for each unit of the pattern information and determine the chirp quantity of the target ultrashort optical pulse based on a composition ratio of each detected chirp.

(e) A plurality of holograms may be formed in parallel in the spatial filter, and the chirp quantity isolation unit may isolate the chirp quantity of target ultrashort optical pulses in parallel by detecting an optical correlation between the target ultrashort optical pulses and the ultrashort optical pulse used as a reference when the target ultrashort optical pulses are introduced into said spatial filter in parallel.

Such being the case, the chirp indicator of ultrashort optical pulse according to the present embodiment shall be described hereafter.

First, the fundamental principle of a chirp detection method used in the chirp indicator of ultrashort optical pulse according to the present embodiment shall be described.

When measuring the chirp quantity of an ultrashort optical pulse, the chirp indicator of ultrashort optical pulse in the present embodiment performs chirp detection with a spectral hologram (for example, see Y. T. Mazurenko, Opt. Spectrosc. (USSR) 57, 343-344 (1984)) as a reference. Using space-time optical information processing realized through time domain processing and space domain processing (for example, see Y. T. Mazurenko, Opt. Spectrosc. (USSR) 57, 343-344 (1984); R. N. Thurston, J. P. Heritage, A. M. Weiner, and W. J. Tomlonson, IEEE J. Quantum Electron. QE-22, 682-696 (1986); K. Ema and F. Shimizu, Jpn. J. Appl. Phys., 29, L631-633 (1990); and T. Konishi, Y. Ichioka, J. Opt. Soc. Am. A, 16, 1076-1088 (1999)), the target ultrashort optical pulse (called "detection target light" hereafter), or in other words, the ultrashort optical pulse in which chirps occur (called "chirped pulse" hereafter) is introduced into a spatial filter. Here, the spatial filter is formed of plural types of spectral holograms (each is called a "hologram" hereafter) in which the amplitude/phase of an optical pulse to be used as a reference (called "sample light" hereafter) is recorded. Furthermore, optical correlation processing is performed on the detection target light and the sample light; the light emitted from the spatial filter and an ideal Fourier transform limit pulse (called "TL pulse" hereafter) used as a gate pulse are caused to interfere with one another, and the resultant is measured. By using the measurement result and determining the hologram in which the amplitude intensity appears strongly in a narrow band, the chirp quantity of the detection target light is determined based on the chirp quantity of the sample light recorded in that hologram.

FIG. 1 is a diagram showing the fundamental principle of the chirp detection method. As shown in FIG. 1, the amplitude/phase information of the sample light w(t) is recorded as a hologram. Introduced light s(t) is introduced into that hologram and the emitted light e(t) is measured. At this time, when there is a strong correlation between the introduced light s(t) and the sample light w(t), light of an amplitude in which a single central peak (called "correlation peak" hereafter) protrudes sharply compared to the periphery (called "autocorrelation light" hereafter) is emitted as the emitted light e(t). On the other hand, when there is a weak correlation between the introduced light s(t) and the sample light w(t), light of an amplitude in which a central peak forms a plateau shape compared to the periphery (called "cross-correlation light" hereafter) is emitted as the emitted light e(t). Thus, the emitted light e(t) is indicated by the following equation.

$$e(t)=\int S(\omega,x)W(\omega,x)\exp(-j\omega t)dt=s(t) \star w(t) \quad \text{Equation 1}$$

Here, $S(\omega, x)$ is a characteristic of the introduced light s(t), and is the phase distribution of the introduced light s(t) spatially expanded on a Fourier plane. $W(\omega, x)$ is a characteristic of the sample light w(t), and is the phase distribution of the sample light w(t) recorded in the hologram. In other words, the emitted light e(t) corresponds to correlation processing of the ultrashort optical pulse in the time domain, it can be realized by matched filtering in the space domain (for example, see K. Tanimura, et al, Jpn. J. Appl. Phys., Vol. 42, pp. 7318-7325 (2003)). Thus, when the characteristic $S(\omega, x)$ of the introduced light s(t) matches with the characteristic $W(\omega, x)$ of the hologram, the emitted light e(t) can be observed as a correlation peak in which energy of the ultrashort optical pulse has gathered. The chirp quantity of the introduced light s(t) can be specified from the size of this correlation peak.

Next, a chirp indicator of ultrashort optical pulse according to the present embodiment shall be described.

Figure 2:
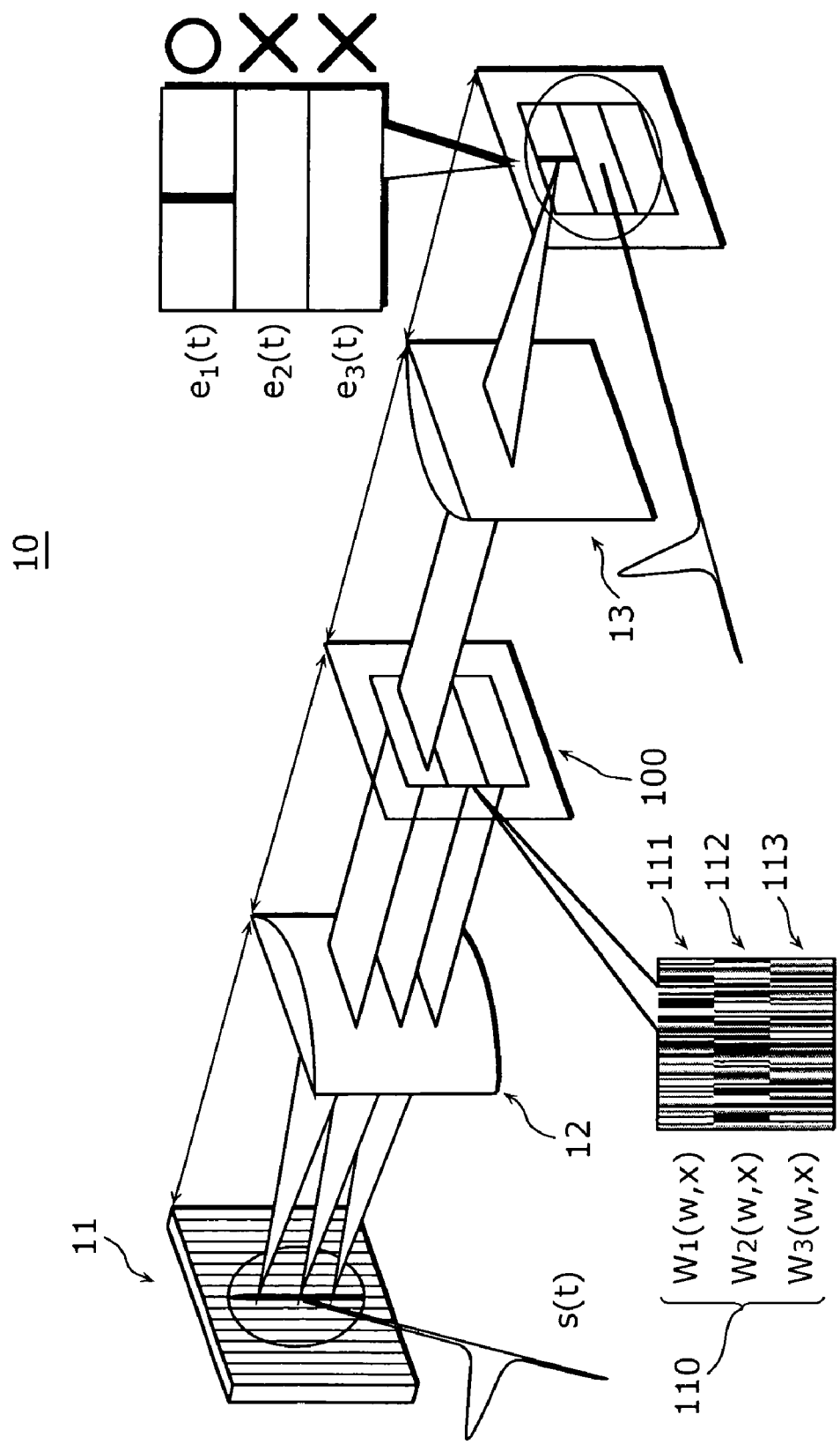
FIG. 2 is a diagram showing a chirp indicator of ultrashort optical pulse.

FIG. 2 is a diagram showing the chirp indicator of ultrashort optical pulse. As shown in FIG. 2, a chirp indicator 10 includes a diffraction grating 11, a collimator lens 12, a focus lens 13, and a spatial filter 100. The diffraction grating 11 is an optical element for extracting a specific wavelength from light with various mixed wavelengths. The collimator lens 12 is an optical element for transforming light of the specific wavelength extracted by the diffraction grating 11 into a parallel beam; or in other words, into light in the space domain. The focus lens 13 is an optical element for focusing the light on which chirp detection processing has been performed by the spatial filter 100. The spatial filter 100 is positioned between the collimator lens 12 and the focus lens 13, so that the light transformed from the time domain into the space domain by the diffraction grating 11 and the collimator lens 12 is introduced into each hologram of a hologram group 110 in parallel.

The spatial filter 100 is an optical element with the sample light recorded as a hologram. Furthermore, holograms are recorded for each sample light, as shown by the hologram group 110. Each hologram in the hologram group 110 is individually calculated using a computer.

In addition, the spatial filter 100 emits the autocorrelation light when the light transformed to the space domain by the diffraction grating 11 and the collimator lens 12 is introduced into each hologram in the hologram group 110 in parallel and there is a strong correlation between that light and the sample light recorded in the hologram. On the other hand, when there is a weak correlation between that light and the sample light recorded in the hologram, the cross-correlation light is emitted.

Then, using a gate pulse having a time range equivalent to a subject of detection is used, and the emitted light is fixed as an interference pattern. While not explicitly indicated in the figures, the fixed interference pattern is analyzed using a CCD camera, a computer, or the like, and the chirp quantity of the ultrashort optical pulse to be detected is determined.

Next, the holograms forming the spatial filter 100 in the present embodiment shall be described.

When creating a hologram that is compatible with an arbitrary ultrashort optical pulse, a computer can be used to create the hologram, without using an actual ultrashort optical pulse. Here, the hologram is created using a computer. To be more specific, the wave form of the emitted light is calculated from the chirp quantity of the introduced light and pattern information of the hologram, in accordance with the fundamentals of computer-generated holograms. At this time, the introduced light is an ultrashort optical pulse in which a linear chirp quantity is applied to a 100 fs half-time, 800 nm central wavelength, 10 nm half-wavelength Fourier transform limit pulse (called "TL pulse" hereafter). Then, the pattern information of the hologram is calculated while applying modulation to the phase distribution of the hologram, under the condition that when introduced light having a specific chirp quantity is introduced into the hologram, a sharp correlation peak appears, while when introduced light having a chirp quantity in an adjacent range is introduced into the hologram, a sharp correlation peak does not appear. However, the problems presented by such a complex condition cannot be mathematically solved in a simple manner; thus, here, an optimization algorithm (simulated annealing) is used to calculate the pattern information of the hologram.

The optimization algorithm (simulated annealing) is an optimization algorithm that uses repeated computations performed by a computer, and is a means of finding an optimal solution to a plurality of problems (Complex Condition problem) that are targets for optimization. It is possible to obtain a true optimal solution without being bound to a logical solution; thus, the optimization algorithm can thus be applied to all problems regardless of the form of the target for optimization, and is used is a variety of fields.

Specifically, in the optimization algorithm (simulated annealing), an evaluation function which evaluates a degree to which the problem has been optimized is used. This evaluation function is expressed as a function of parameters to be optimized, and is set so as to decrease in value the higher the degree of optimization. First, initial parameters to be optimized are determined at random. Perturbation is applied to these parameters at random. In the initial state, the size of the perturbation is large, causing the value of the evaluation function to change at random. The size of the perturbation is gradually reduced while repeatedly applying the random perturbation. As the perturbation decreases, it gradually becomes more difficult for the value of the evaluation function to break away from a minimum. By repeating the perturbation until it has become sufficiently small, a minimum value of the evaluation function is obtained, and the parameters at that time are the optimal solution to the problem.

In other words, with the optimization algorithm (simulated annealing), a random perturbation is repeatedly applied to the parameters of the problem to be optimized, and the size of the perturbation is gradually reduced while evaluating the degree of optimization of the target of optimization when the perturbation is applied. This is repeated while causing the parameters to be optimized to gradually converge, until the size of the perturbation becomes sufficiently small. Accordingly, it is possible to find a minimum value without being bound to the logical minimum, and possible to obtain the optimal solution of the parameters to be optimized.

In this manner, with the optimization algorithm (simulated annealing), it is possible to perform optimization processing simultaneously on plural optimization parameters. Moreover, the optimization algorithm (simulated annealing) is superior in comparison with other algorithms in that a true optimal solution to the evaluation function can be obtained without falling into a logical solution. Furthermore, the optimization algorithm (simulated annealing) can be changed in accordance with a goal of the evaluation function, and this is applicable to all problems regardless of the form of the optimization target.

Figure 3:
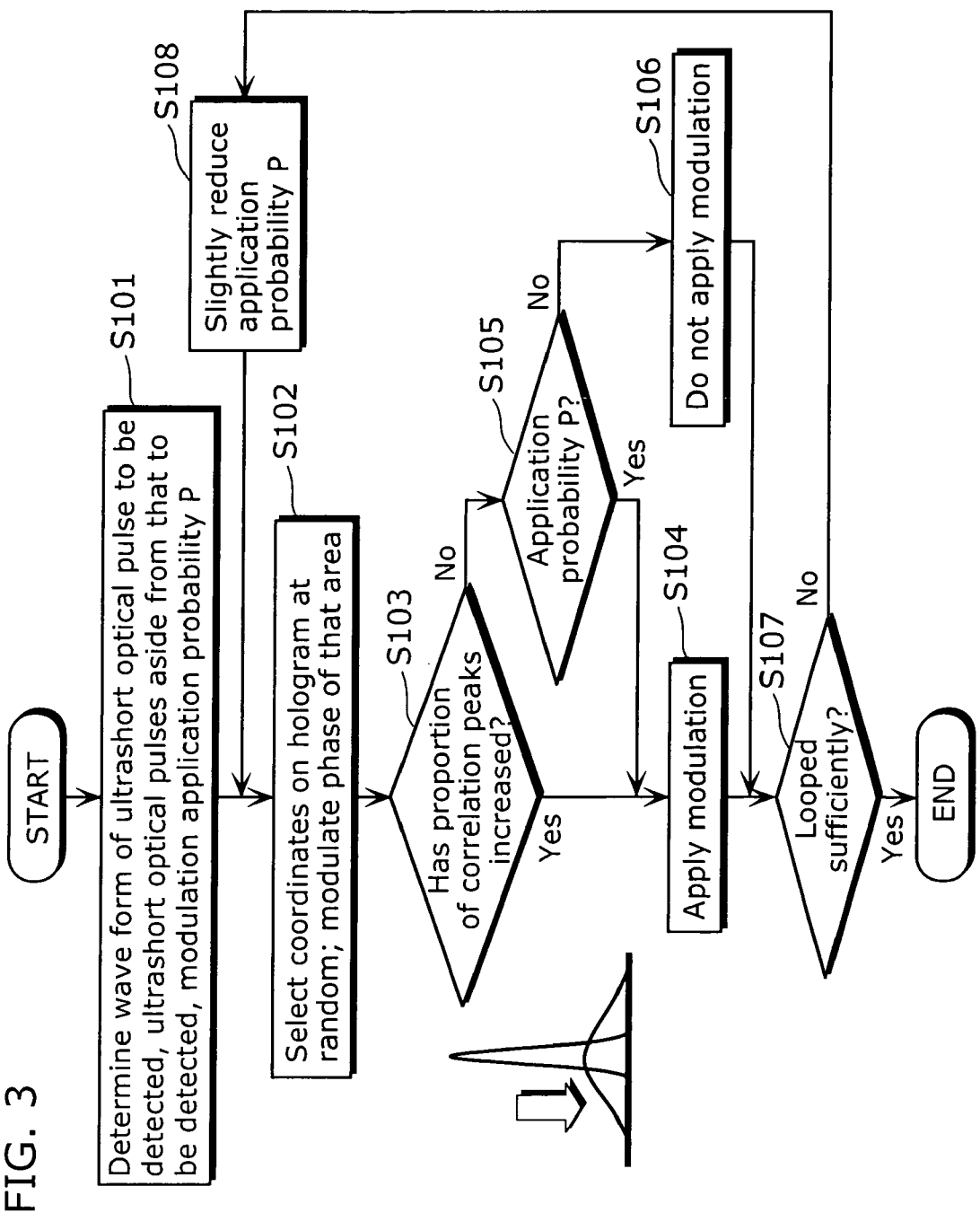
FIG. 3 is a flowchart showing an operation for calculating hologram pattern information.

FIG. 3 is a flowchart showing an operation for calculating hologram pattern information. As shown in FIG. 3, the pattern information of the hologram is calculated through the processing shown in the following steps S101 through S108. Note that the ultrashort optical pulse to be detected is used as the sample light to be recorded in the hologram.

First, the wave form of the ultrashort optical pulse to be detected, the wave form of ultrashort optical pulses aside from those to be detected, and an application probability P for modulation applied to modulate the phase distribution of a selected area on the hologram, are determined as initial Values (S101).

Next, coordinates on the hologram are selected at random, and the phase distribution of the selected coordinates is modulated (S102).

Next, a ratio of the correlation peaks among each light emitted from the modulated hologram is calculated, in the case where the target ultrashort optical pulse and ultrashort optical pulses aside from those to be detected are each introduced into the modulated hologram. The calculated ratio of the correlation peaks is compared to the ratio of the correlation peaks calculated before the modulation, and it is determined whether or not there has been an increase in the ratio (S103).

In the case where a result of the judgment shows an increase in the ratio of the correlation peaks (Yes of S103), the modulation of the phase distribution performed on the selected coordinates is applied (S104). However, in the case where no increase in ratio of the correlation peaks is shown (No of S103), according to the application probability P (S105) the modulation is applied (S104) or the modulation is not applied (S106).

Until the operation has looped sufficiently (S107), the steps S102 to S106 are repeatedly performed (No of S107) while slightly lowering the application probability P (S108); modulation is performed so that a sharp correlation peak appears in the case where the introduced light is an target ultrashort optical pulse, and is performed so that a sharp correlation peak does not appear in the case where the introduced light is an ultrashort optical pulse aside from those to be detected, and in such a manner, the phase distribution of the hologram is modulated so the ratio of the correlation peak to a crosstalk peak reaches a maximum.

In other words, information of the amplitude/phase of the sample light is calculated so that the ratio of the correlation peak to the crosstalk peak reaches a maximum. The spatial filter 100 then records the pattern information of the hologram calculated in such a manner as the hologram.

Figure 4:
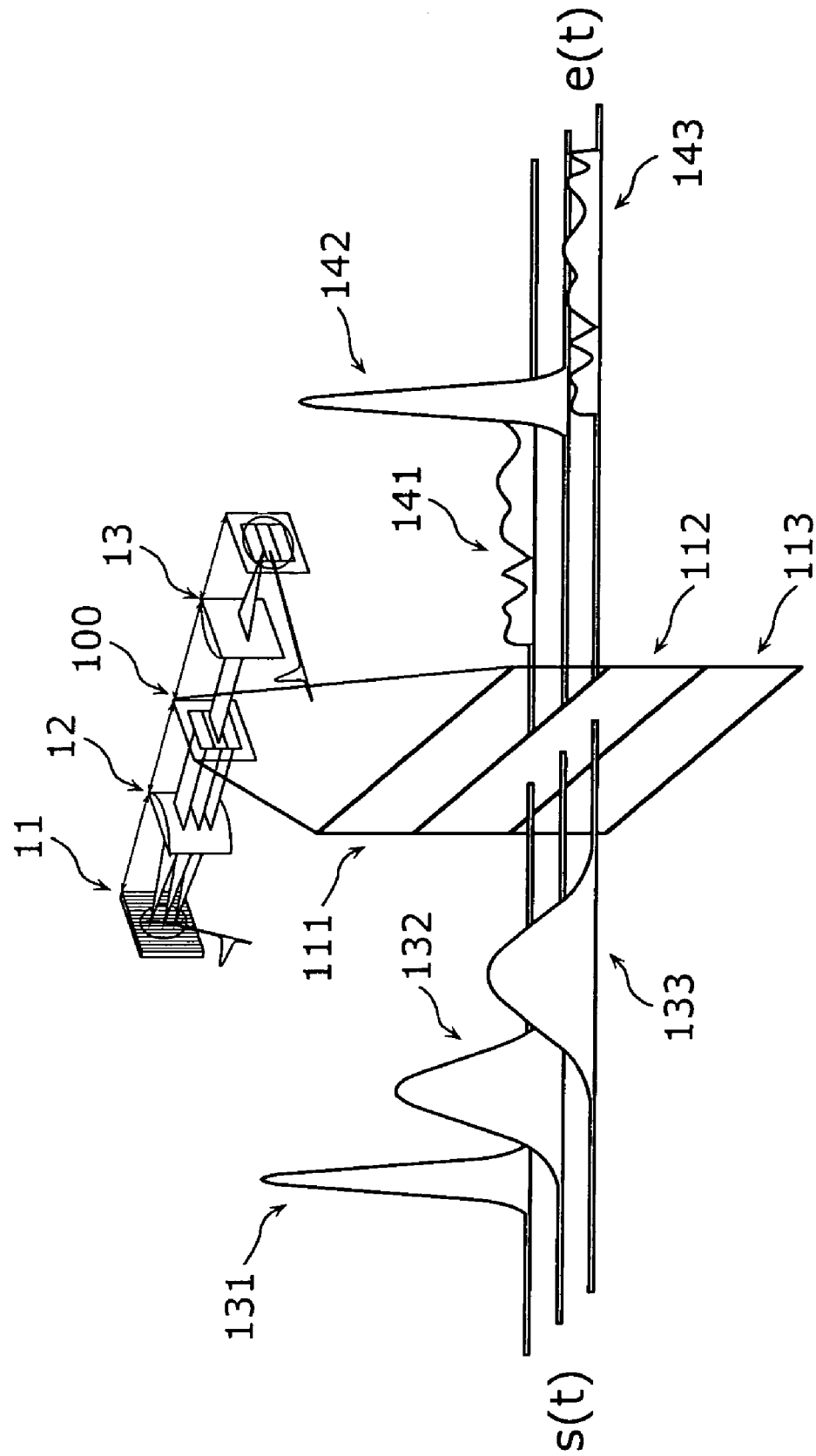
FIG. 4 is a diagram showing a relationship between light introduced into a hologram and light emitted from the hologram in the preferred embodiment.
Figure 5B:
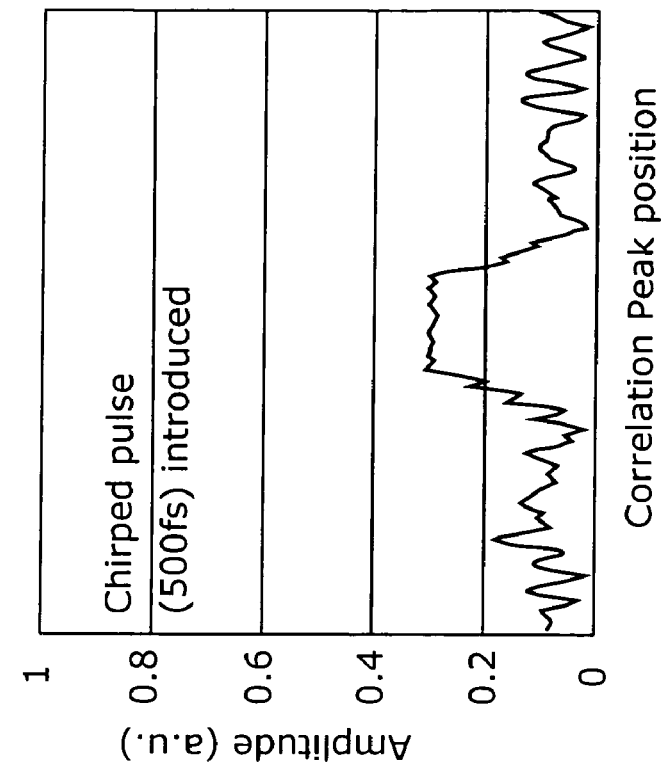
FIG. 5B is a diagram showing a result of a simulation of emitted light when an ultrashort optical pulse, which is not a TL pulse, is introduced into a hologram for detecting TL pulses and light is emitted.
Figure 5A:
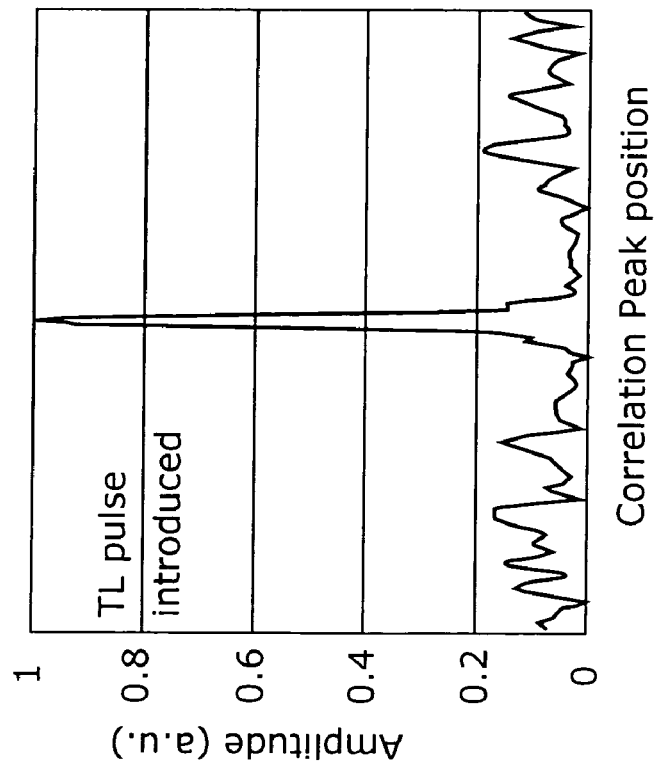
FIG. 5A is a diagram showing a result of a simulation of emitted light when a TL pulse is introduced into a hologram for detecting TL pulses and light is emitted.
Figure 6:
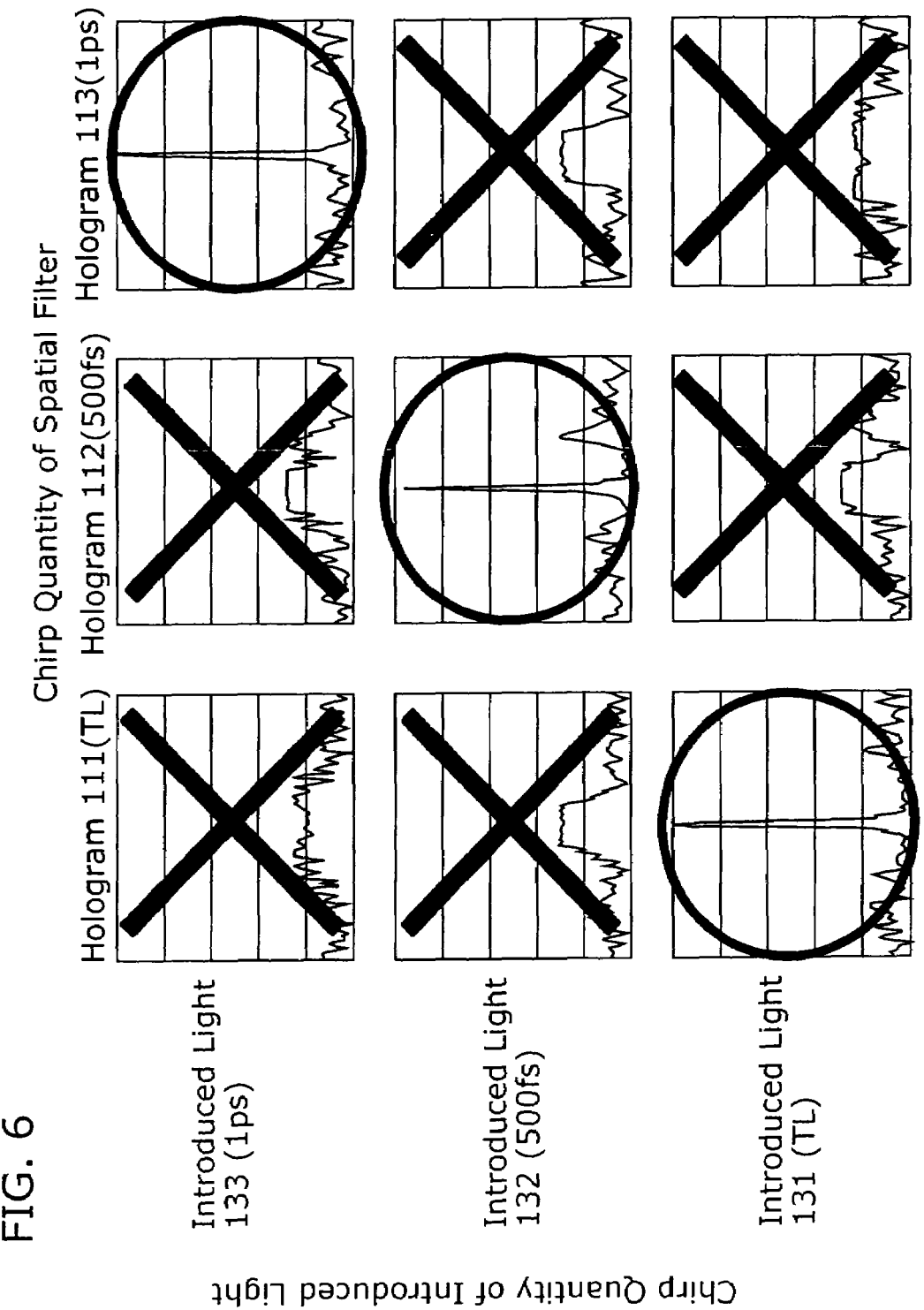
FIG. 6 is a diagram showing a result of a simulation of light emitted from each hologram.

FIG. 4 is a diagram showing a relationship between light introduced into a hologram and light emitted from the hologram in the preferred embodiment. FIG. 5A is a diagram showing a result of a simulation of emitted light when a TL pulse is introduced into a hologram for detecting TL pulses and light is emitted. FIG. 5B is a diagram showing a result of a simulation of emitted light when an ultrashort optical pulse, which is not a TL pulse, is introduced into a hologram for detecting TL pulses and light is emitted. FIG. 6 is a diagram showing a result of a simulation of light emitted from each hologram.

Here, as an example, pattern information of holograms for detecting three types of ultrashort optical pulses, including a TL pulse, is prepared, and correlation peaks appearing when the chirp quantity of the introduced light is converted to linear form are simulated.

For example, an introduced light 131 is a TL pulse. An introduced light 132 is an ultrashort optical pulse in which a TL pulse is given a 500 fs chirp quantity (called "chirped pulse (500 fs)" hereafter). An introduced light 133 is an ultrashort optical pulse in which a TL pulse is given a 1 ps chirp quantity (called "chirped pulse (1 ps)" hereafter). A hologram 111 is a hologram in which a TL pulse is recorded as the sample light (called "TL pulse hologram" hereafter). A hologram 112 is a hologram in which a chirped pulse (500 fs) is recorded as the sample light (called "chirped pulse (500 fs) hologram" hereafter). A hologram 113 is a hologram in which a chirped pulse (1 ps) is recorded as the sample light (called "chirped pulse (1 ps) hologram" hereafter).

At this time, as shown in FIG. 4, when an target ultrashort optical pulse, such as the introduced light 132, is introduced into the hologram 112, there is a strong correlation between the introduced light and the sample light; therefore, an autocorrelation light, such as an emitted light 142, is emitted from the hologram 112 (for example, see FIG. 5A). On the other hand, when an ultrashort optical pulse aside from that to be detected, such as the introduced light 131 and 133, is introduced into the hologram 112, there is a weak correlation between the introduced light and the sample light; therefore, a cross-correlation light, such as emitted lights 141 and 143, is emitted from the hologram 112 (for example, see FIG. 5B).

Based on this, when the introduced light 131 is introduced into the hologram 111, an autocorrelation light is emitted from the hologram 111, as shown in FIG. 6. When the introduced light 132, the introduced light 133, or the like is introduced into the hologram 111, a cross-correlation light is emitted from the hologram 111. In addition, when the introduced light 132 is introduced into the hologram 112, an autocorrelation light is emitted from the hologram 112. When the introduced light 131, the introduced light 133, or the like is introduced into the hologram 112, a cross-correlation light is emitted from the hologram 112. Moreover, when the introduced light 133 is introduced into the hologram 113, an autocorrelation light is emitted from the hologram 113. When the introduced light 131, the introduced light 132, or the like is introduced into the hologram 113, a cross-correlation light is emitted from the hologram 113.

In such a manner, the correlation peak appearing in the amplitude of the light emitted from the hologram appears in a narrower band as a higher peak the stronger the correlation between the introduced light and the sample light, and appears in a wider band as a lower peak the weaker the correlation between the introduced light and the sample light. Furthermore, the correlation peak reaches a maximum height when the chirp quantities of the introduced light and the sample light match, and a TL pulse is emitted as the autocorrelation light. When the chirp quantities of the introduced light and the sample light do not match, the correlation peak becomes lower according to the difference between the chirp quantity of the introduced light and the chirp quantity of the sample light, and a scattered light is emitted as the cross-correlation light. In other words, a change in the waveform of the emitted light occurs depending on the chirp quantity.

In addition, even if the introduced light 131 and the introduced light 132 are introduced into the hologram 111 simultaneously, the autocorrelation light emitted from the hologram 111 is caused by the introduced light 131. Similarly, even if the introduced light 131 and the introduced light 132 are introduced into the hologram 112 simultaneously, the autocorrelation light emitted from the hologram 112 is caused by the introduced light 132.

In this manner, even if a plurality of ultrashort optical pulses are introduced into a hologram simultaneously, it is possible to identify the autocorrelation light and cross-correlation light emitted from that hologram, and thus it is possible to introduce a plurality of ultrashort optical pulses into the hologram simultaneously. Furthermore, by arranging the holograms in an array shape, it is possible to simultaneously introduce a plurality of ultrashort optical pulses into a hologram group, and thus possible to detect the chirp quantities of the plurality of ultrashort optical pulses in parallel.

Accordingly, in a chirp indicator 10, a plurality of holograms are arranged, in parallel, in the spatial filter 100. The target ultrashort optical pulses are introduced into the plurality of holograms in parallel; the optical correlation between the target ultrashort optical pulses and the ultrashort optical pulse used as a reference is detected; and the chirp quantities of the ultrashort optical pulses to be detected are determined in parallel.

Next, a spatial filter created using an electric etching device in accordance with the holograms calculated in the above manner is described.

Figure 7B:
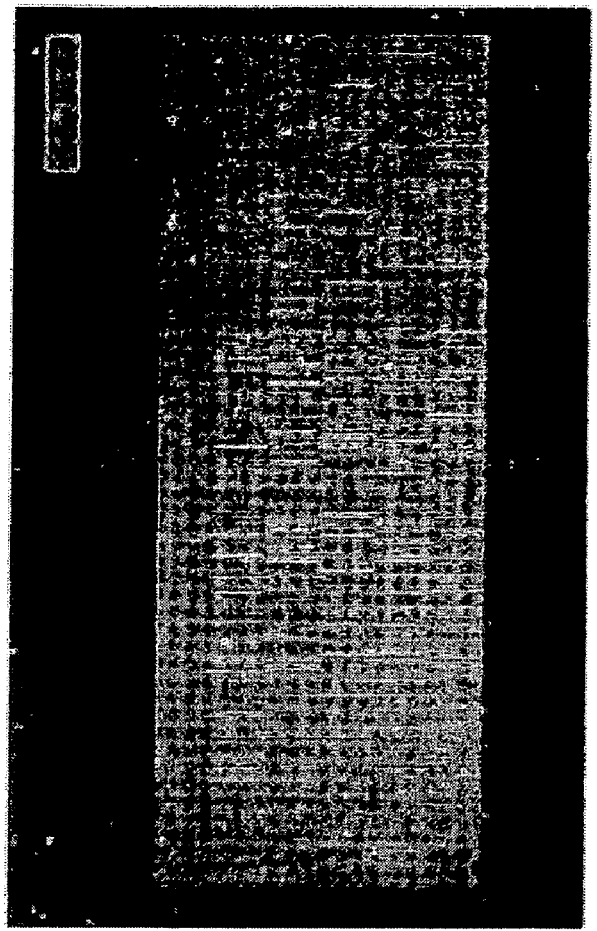
FIG. 7B is a planar diagram showing an appearance of the spatial filter.
Figure 7A:
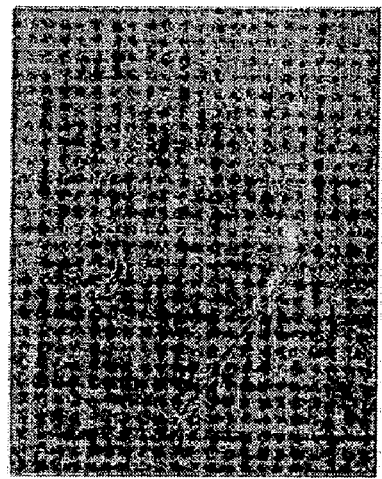
FIG. 7A is a strabismus diagram showing an appearance of a spatial filter.

FIG. 7A is a strabismus diagram showing an appearance of the spatial filter. FIG. 7B is a plane figure showing an appearance of the spatial filter. As shown in FIGS. 7A and 7B, each hologram is formed on a glass substrate with sides 1 inch in length. The holograms are 0.8 mm in height and 7.5 mm in width, and are arranged in array form in the shorter direction. Furthermore, a multitude of grooves 0.88 μm in depth and 3.125 μm in width are formed using the electric etching device, in accordance with the pattern information of each hologram that has been calculated using a computer. Depending on an area determined by the width and depth of the grooves, a phase delay of the introduced light is adjusted, and binary phase modulation of 0 and π is performed on the introduced light.

Next, an experimental optical system for testing the spatial filter of the present embodiment shall be described.

Figure 9:
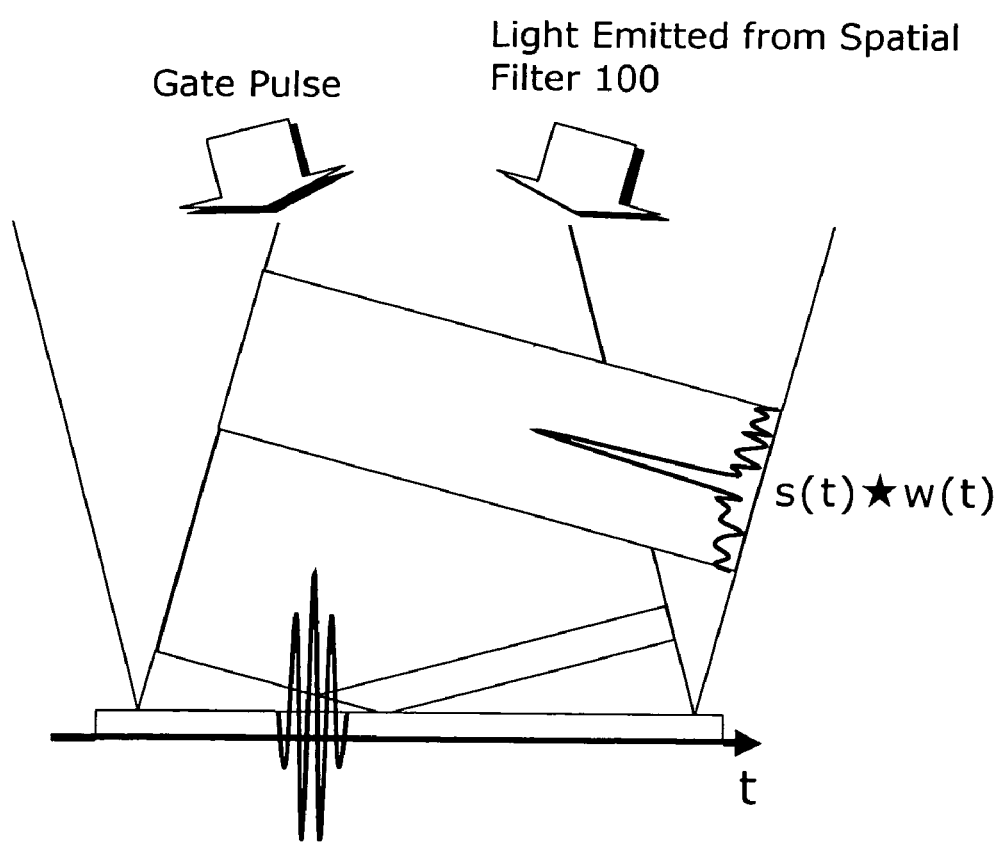
FIG. 9 is a diagram showing measurement performed with an optical time gate that uses a gate pulse.
Figure 10:
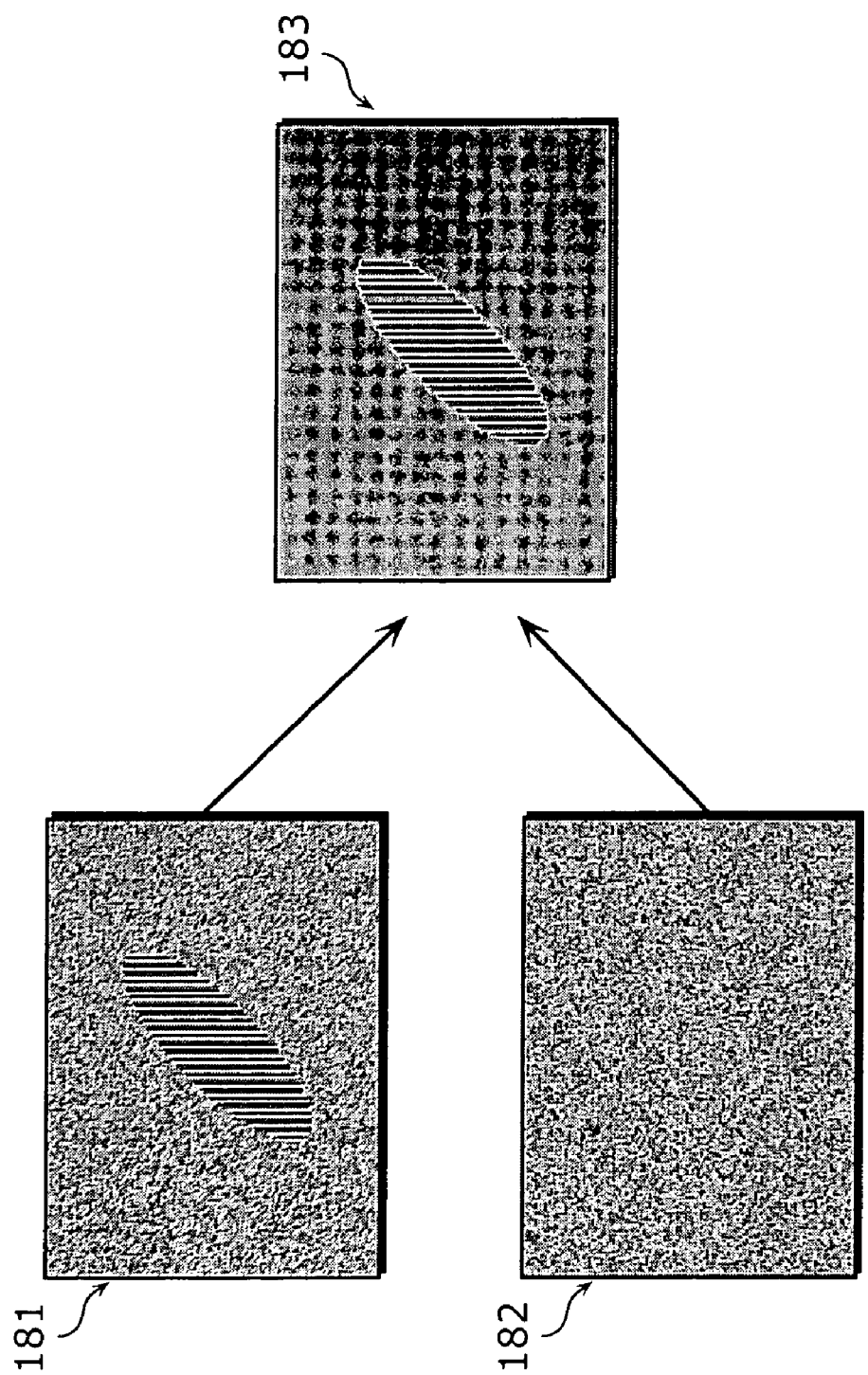
FIG. 10 is a diagram showing a profile in which an interference pattern is extracted from a filmed image.
Figure 11:
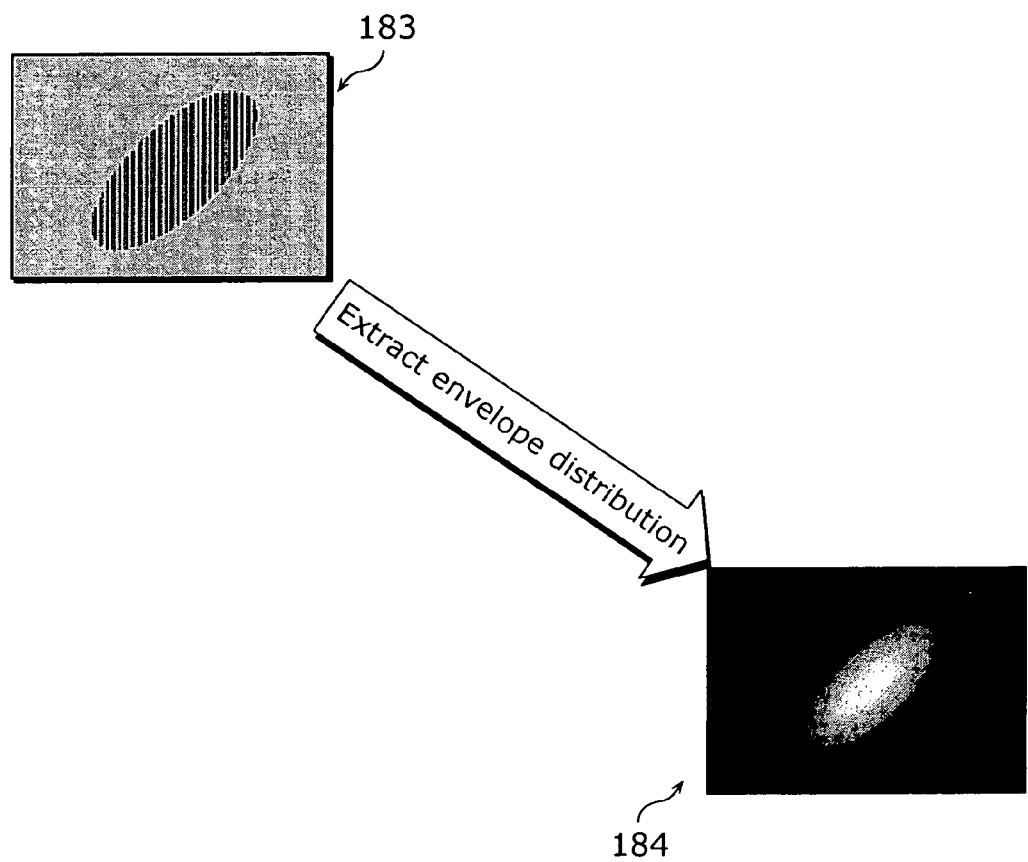
FIG. 11 is a diagram showing an interference pattern and an envelope distribution extracted from the interference pattern.

FIG. 8 is a diagram showing a configuration of the experimental optical system for testing the spatial filter. FIG. 9 is a diagram showing measurement performed with an optical time gate that uses a gate pulse. FIG. 10 is a diagram showing a profile in which an interference pattern is extracted from a filmed image. FIG. 11 is a diagram showing an interference pattern and an envelope distribution extracted from the interference pattern.

As shown in FIG. 8, an experimental optical system 150 is roughly configured of a pulse forming unit 151 and a chirp detection unit 152.

The pulse forming unit 151 uses mirrors, a beam splitter, a diffraction grating, a collimator lens, a focus lens, a pulse forming filter, and the like to form a femtosecond laser (800 MHz frequency, 800 nm wavelength) emitted from a light source 161. A TL pulse and a chirped pulse obtained from the forming is emitted.

The chirp detection unit 152 uses mirrors, a beam splitter, a diffraction grating, a collimator lens, a focus lens, a hologram, and the like to measure the chirp quantity of the chirped pulse emitted from the pulse forming unit 151.

At this time, as shown in FIG. 9, it is possible to fix spatial diffusion of the emitted light as an interference pattern on a receiving surface of an image sensor of a CCD camera 171, through cross-correlation processing based on a spatial Time-of-Flight interference between the light emitted from the hologram and the gate pulse used as the optical time gate.

Accordingly, the interference pattern appears on the image sensor of the CCD camera 171, and that interference pattern is filmed by the CCD camera 171. Furthermore, optical correlation processing is carried out between the introduced light and the sample light, and thus, unlike autocorrelation processing, a discrepancy appears in the emitted light depending on the chirp quantity.

Then, using a computer 172, spectra are analyzed from the filmed interference pattern. At this time, as shown in FIG. 10, the interference pattern appears in the background of the image (image 181) filmed by the CCD camera 171. Accordingly, using a Fast Fourier Transform (FFT), a bias component (image 182) is removed from the image filmed by the CCD camera 171 (the image 181) and the interference pattern (image 183) is extracted. Then, as shown in FIG. 11, an envelope (image 184) of the extracted interference pattern (image 183) is extracted.

Next, an example measurement of a linear chirped pulse shall be described.

Figure 12:
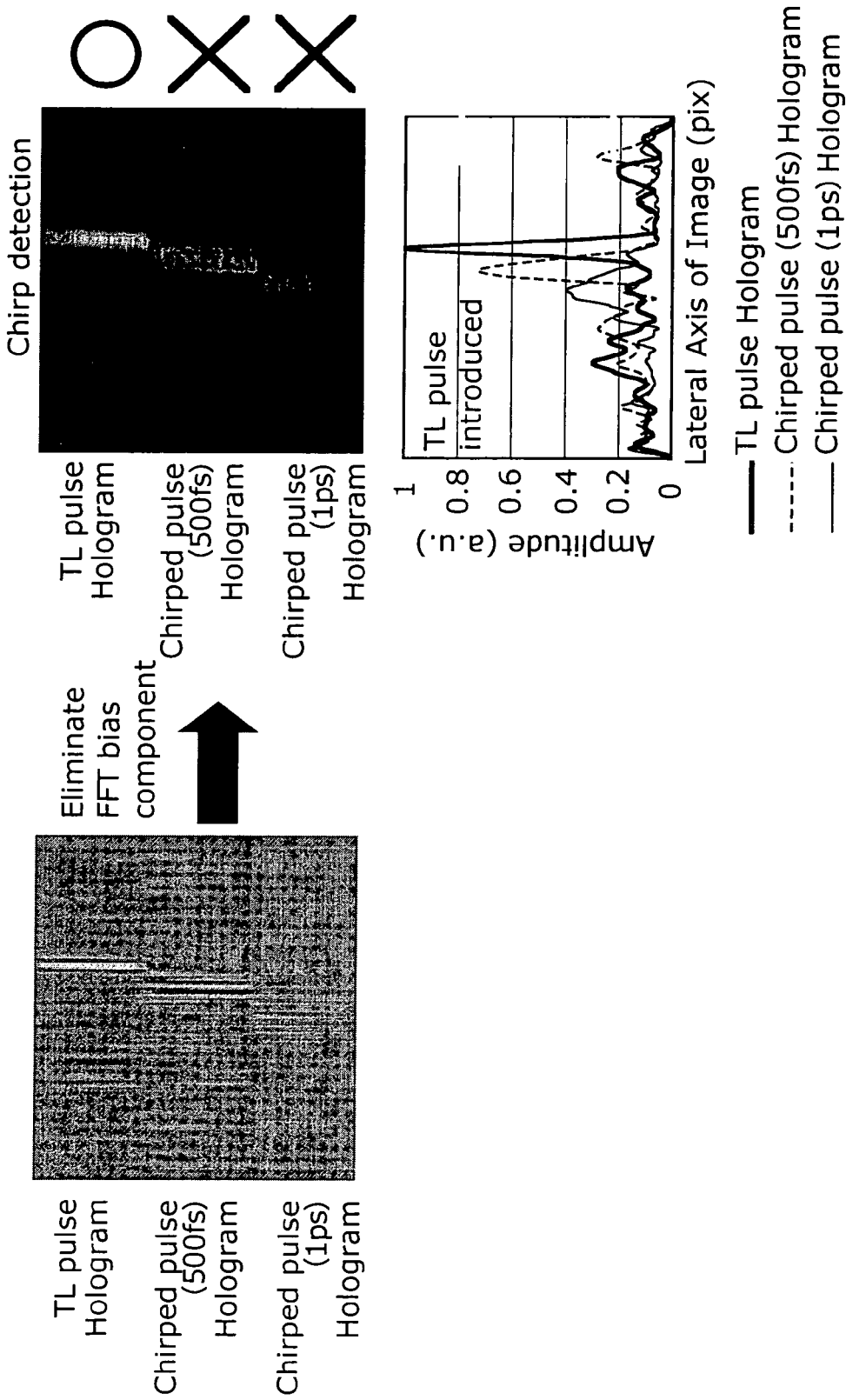
FIG. 12 is a diagram showing correlation peaks obtained when introducing a TL pulse into each hologram.
Figure 13:
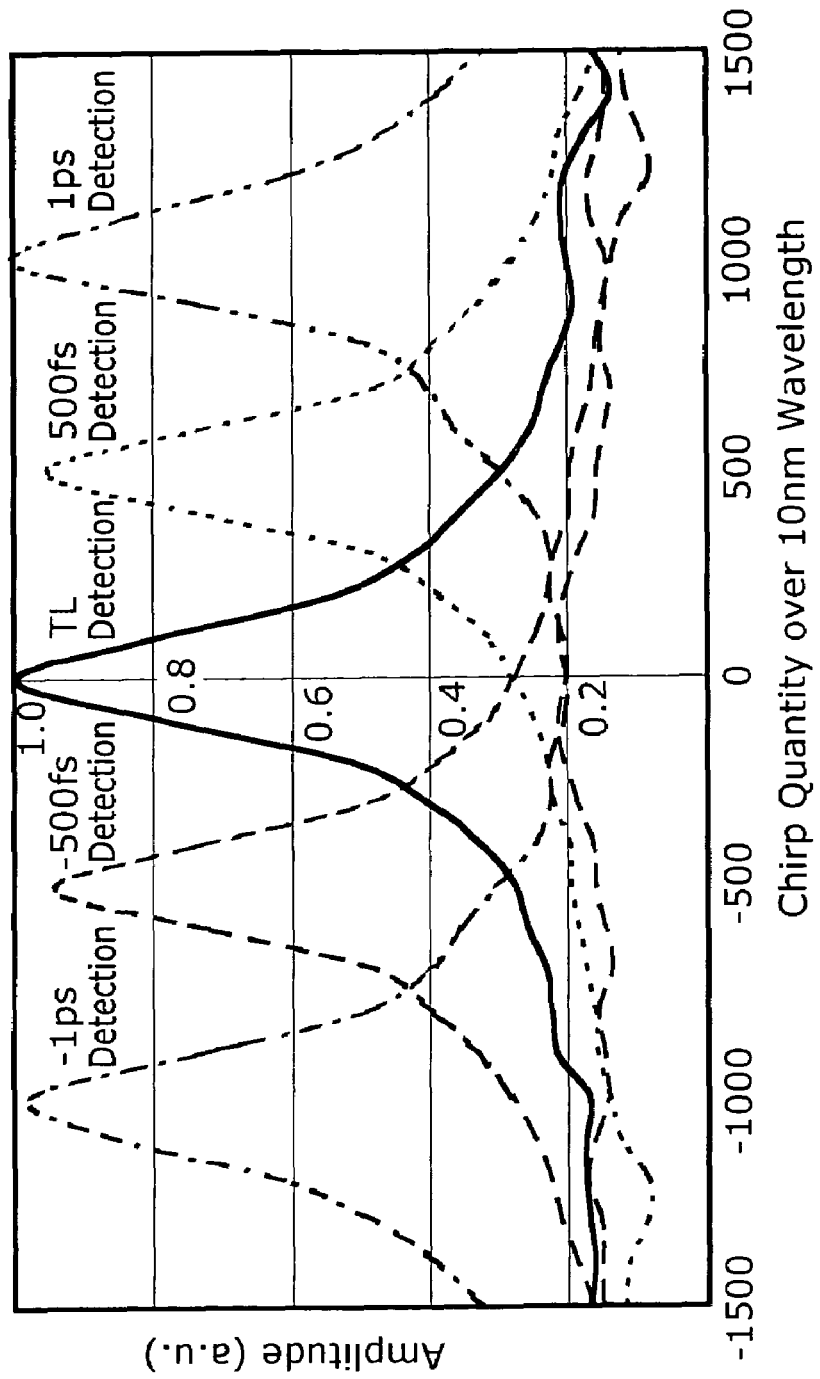
FIG. 13 is a diagram showing the sensitivity of each hologram.
Figure 14A:
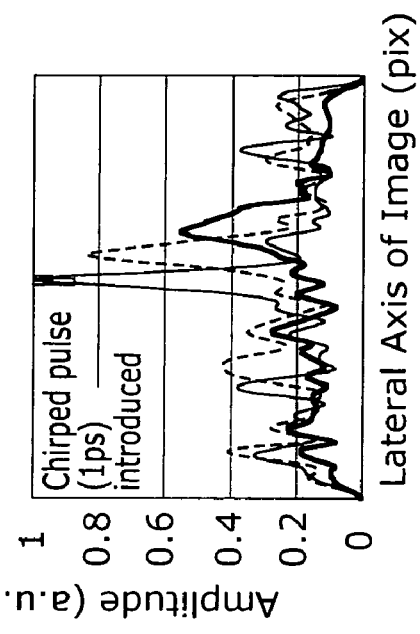
FIG. 14A is a diagram showing an envelope distribution of emitted light when a TL pulse is introduced into each hologram.
Figure 14C:
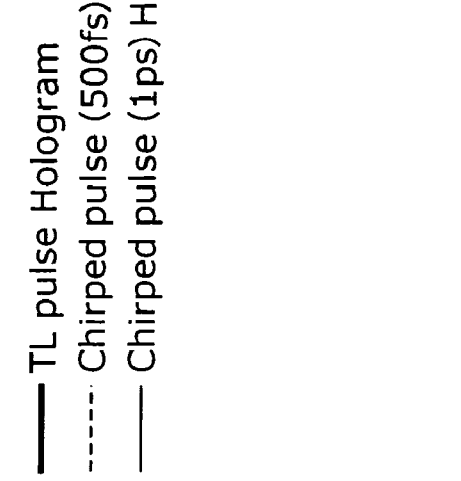
FIG. 14C is a diagram showing an envelope distribution of emitted light when a chirped pulse (1 ps) is introduced into each hologram.
Figure 14B:
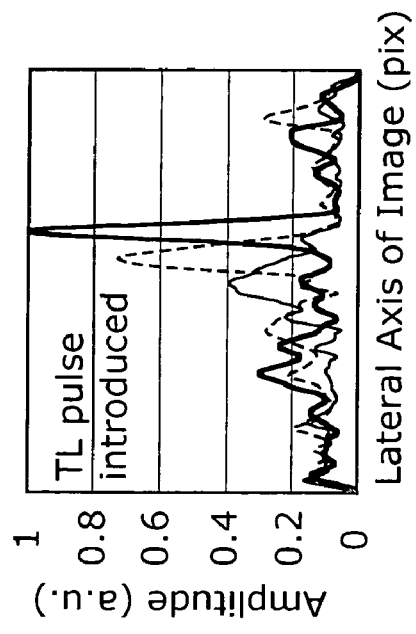
FIG. 14B is a diagram showing an envelope distribution of emitted light when a chirped pulse (500 fs) is introduced into each hologram.

FIG. 12 is a diagram showing correlation peaks obtained when introducing a TL pulse into each hologram; FIG. 13 is a diagram showing the sensitivity of each hologram; FIG. 14A is a diagram showing an envelope distribution of emitted light when a TL pulse is introduced into each hologram; FIG. 14B is a diagram showing an envelope distribution of emitted light when a chirped pulse (500 fs) is introduced into each hologram; and FIG. 14C is a diagram showing an envelope distribution of emitted light when a chirped pulse (1 ps) is introduced into each hologram.

For example, as shown in FIG. 12, when a TL pulse is introduced into a hologram for TL pulses, a light in which the energy of the TL pulse is spatially concentrated is emitted, in the same manner as the result of the simulation. On the other hand, when a TL pulse is introduced into a hologram aside from a hologram for TL pulses, a light in which the energy of the TL pulse is spatially spread according to the difference in the chirp quantities is emitted. Here, a bright area in the image indicates a part with a large amplitude, and a dark area indicates a part with a small amplitude.

In addition, as shown in FIG. 13, each hologram shows a certain degree of sensitivity between each range, and thus it is possible to determine the chirp quantity of a chirped pulse equivalent to the chirp quantity of each sample light based on the intensity of the amplitude of the light emitted from each hologram.

Here, a plurality of units of pattern information with differing chirp quantities are each recorded as holograms in the spatial filter 100. The chirp indicator 10 detects, per hologram, chirps in the target ultrashort optical pulse, and determines the chirp quantity of the target ultrashort optical pulse based on a composition ratio of each detected chirp.

For example, the height of the correlation peak in the light emitted from the hologram for TL pulses decreases as the chirp quantity increases, within a chirp quantity range of 0 fs to 500 fs. However, the height of the correlation peak in the light emitted from the hologram for chirped pulses (500 fs) increases as the chirp quantity increases, within a chirp quantity range of 0 fs to 500 fs.

Thus, by using the characteristics, depending on the intensity of the amplitude of light emitted from each hologram, a composition ratio of chirp quantity corresponding to each hologram which emits the light is determined. Here, the higher the intensity of the amplitude of the emitted light is, the higher the ratio of the chirp quantity corresponding to the hologram is estimated. On the other hand, the lower the intensity of the amplitude of the emitted light is, the lower the ratio of the chirp quantity corresponding to the hologram is estimated. Then, based on the ratio estimated as described above, chirp quantity of the ultrashort optical pulse to be detected is determined.

Here, as one example, it is assumed that the intensity of the amplitude of the light emitted from the hologram for TL pulses is almost as high as the intensity of the amplitude of the light emitted from the hologram for chirp pulses (500 fs). In this example, because of the same height of both intensity of the amplitude of the emitted light, a ratio of chirp quantity 0 fs to chirp quantity 500 fs is estimated as 1:1, so that chirp quantity of the ultrashort optical pulse to be detected can be determined as 250 fs. This can be also seen in the graph of FIG. 13.

Thereby, by using the intensity of the amplitude of the light emitted from the hologram for TL pulses and the hologram for chirp pulses (500 fs), it is possible to determine, to a certain extent, the chirp quantity found within a chirp range of 0 fs to 500 fs.

In the same manner, within a chirp quantity range of 500 fs to 1000 fs, by using the hologram for chirped pulses (500 fs) and the hologram for chirped pulses (1 ps), it is possible to determine, to a certain extent, the chirp quantities of chirped pulses corresponding to each chirp quantity range.

Note that the vertical axis of the graph indicates the amplitude of the correlation peak, and the horizontal axis indicates the chirp quantity over a 10 nm wavelength. The light emitted from the hologram for TL pulses is indicated by a solid line; the light emitted from the hologram for chirped pulses (−1 ps) is indicated by a dot-dash line; the light emitted from the hologram for chirped pulses (−500 fs) is indicated by a dash line; the light emitted from the hologram for chirped pulses (500 fs) is indicated by a dotted line; and the light emitted from the hologram for chirped pulses (1 ps) is indicated by a double dot-dash line.

As shown in FIG. 14A, when a TL pulse is introduced into each hologram, light having an amplitude in which a peak clearly protrudes compared to the periphery is emitted from the hologram for TL pulses. Light having an amplitude in which a peak with less difference compared to the periphery, and which is lower compared to that of the light emitted from the hologram for TL pulses, is emitted from the hologram for chirped pulses (500 fs). Light having an amplitude in which a peak with even less difference compared to the periphery, and which is lower compared to that of the light emitted from the hologram for chirped pulses (500 fs), is emitted from the hologram for chirped pulses (1 ps).

As shown in FIG. 14B, when a chirped pulse (500 fs) is introduced into each hologram, light having an amplitude in which a peak clearly protrudes compared to the periphery is emitted from the hologram for chirped pulses (500 fs). Light having an amplitude in which a peak with less difference compared to the periphery, and which is lower compared to that of the light emitted from the hologram for chirped pulses (500 fs), is emitted from the hologram for chirped pulses (1 ps). Light having an amplitude in which a peak with even less difference compared to the periphery, and which is lower compared to that of the light emitted from the hologram for chirped pulses (1 ps), is emitted from the hologram for TL pulses.

As shown in FIG. 14C, when a chirped pulse (1 ps) is introduced into each hologram, light having an amplitude in which a peak clearly protrudes compared to the periphery is emitted from the hologram for chirped pulses (1 ps). Light having an amplitude in which a peak with less difference compared to the periphery, and which is lower compared to that of the light emitted from the hologram for chirped pulses (1 ps), is emitted from the hologram for chirped pulses (500 fs). Light having an amplitude in which a peak with even less difference compared to the periphery, and which is lower compared to that of the light emitted from the hologram for chirped pulses (500 fs), is emitted from the hologram for TL pulses.

In such a manner, when measuring a linear chirped pulse, a correlation peak can be seen in each hologram only when the corresponding ultrashort optical pulse is introduced into the hologram.

Note that the vertical axis of the graph indicates the amplitude, and the horizontal axis indicates a position on the horizontal of the hologram. In addition, the envelope of the light emitted by the hologram for TL pulses is indicated by a bold line; the envelope of the light emitted by the hologram for chirped pulses (500 fs) is indicated by a dotted line; and the envelope of the light emitted by the hologram for chirped pulses (1 ps) is indicated by a thin line.

Next, light emitted when a non-linear chirped pulse is introduced into a hologram shall be described.

Figure 15:
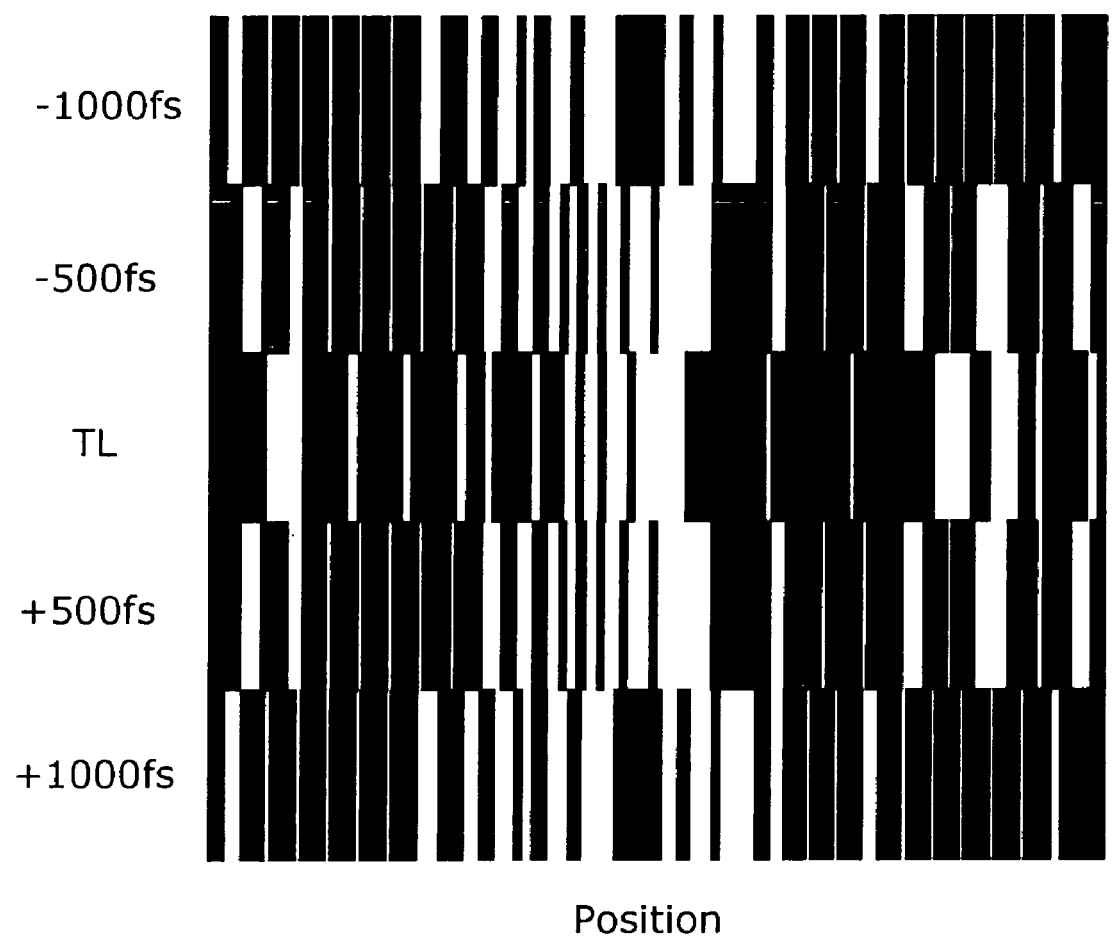
FIG. 15 is a diagram showing correlation peaks obtained when non-linear chirped pulses are introduced in parallel into each hologram.

FIG. 15 is a diagram showing correlation peaks obtained when non-linear chirped pulses are introduced in parallel into each hologram.

Here, a bright area in the image indicates a part with a large amplitude, and a dark area indicates a part with a small amplitude. Here, as an example, an ultrashort optical pulse having a secondary non-linear chirp, and in which the chirp quantity of a wavelength from 795 nm to 805 nm is 1 ps, has been selected as the non-linear chirped pulse. Light emitted after introducing this non-linear chirped pulse into a hologram has been simulated, and a hologram created.

Moreover, a plurality of units of pattern information with differing chirp quantities are each recorded as holograms in the spatial filter 100. The chirp indicator 10 detects, per hologram, chirps in the target ultrashort optical pulse, and determines the chirp quantity of the target ultrashort optical pulse based on a composition ratio of each detected chirp.

As shown in FIG. 15, here, as one example, it is assumed that secondary non-linear chirp pulses are irradiated simultaneously to five kinds of holograms for detecting five kinds of linear chirp pulses including the TL pulses. In this example, from the five kinds of holograms, light having respective correlation peaks is emitted, respectively. Here, when the light emitted from those holograms are compared, the correlation peaks appear in different positions. This indicates that the chirped pulses corresponding to respective holograms occur at different times. From this result, it is possible detect an arbitrary chirp as approximated to a plurality of linear chirp components. Then, using this result, it is possible detect an arbitrary non-linear chirp as approximated to a plurality of linear chirp components. In other words, by combining a plurality of holograms and evaluating a non-linear chirped pulse, it is possible to measure the non-linear chirped pulse.

More specifically, in the same manner as described for the determination of the chirp quantity of the arbitrary linear chirp pulse using a plurality of holograms, a composition ratio of the chirp quantity corresponding to each hologram is determined, depending on the intensity of the amplitude of the light emitted from each hologram. However, in the case of the non-linear chirp pulse, light, whose amplitude intensity is higher compared to the case of the linear chirp pulse, is emitted from the plurality of holograms. Therefore, the difference is that the non-linear chirp pulse is approximated by a plurality of linear chirp pulses, and thereby each chirp quantity of the approximated plurality of linear chirp pulses is determined.

According to the chirp indicator of ultrashort optical pulse in the present embodiment, information of the amplitude/phase of an ultrashort optical pulse used as a reference is recorded as a hologram. Furthermore, such hologram is formed in a spatial filter, and such spatial filter is used as a standard for measuring the chirp quantity. Therefore, it is possible to consistently obtain the ultrashort optical pulse used as the reference.

Furthermore, the chirp quantity of the ultrashort optical pulse is measured by introducing the target ultrashort optical pulse into the spatial filter and performing processing which detects the optical correlation between the target ultrashort optical pulse and the ultrashort optical pulse used as the reference. Accordingly, the chirp quantity of the ultrashort optical pulse can be measured with the pulse still in light form, rather than converting the light to electricity; therefore, a drop in the throughput can be suppressed.

Furthermore, the spatial filter is formed by arranging a plurality of holograms in an array shape. Thus, the chirp quantity of the ultra short optical pulse can be measured over a plurality of ranges. In addition, when measuring a non-linear chirped pulse, it is possible to carry out measurement using a combination of holograms with differing characteristics.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention is applicable as a chirp indicator of ultrashort optical pulse which measures the chirp quantity of an ultrashort optical pulse, and is particularly applicable as a chirp indicator of ultrashort optical pulse which performs optical correlation processing using sample light recorded as a hologram and measures the chirp quantity of an ultrashort optical pulse.

What is claimed is:

1. A chirp indicator that measures chirp quantity of an ultrashort optical pulse, said chirp indicator comprising:
a spatial filter in which a hologram is formed, the hologram having information of chirp quantity of an ultrashort optical pulse used as a reference recorded, and
a chirp quantity determination unit operable to determine a chirp quantity of a target ultrashort optical pulse by detecting an optical correlation between the target ultrashort optical pulse and the ultrashort optical pulse used as a reference when the target ultrashort optical pulse is introduced into said spatial filter.

2. The chirp indicator according to claim 1,
wherein the information of chirp quantity of the ultrashort optical pulse used as a reference is pattern information calculated so that a ratio of the correlation peak detected by said chirp quantity isolation unit to a crosstalk peak is a maximum, and
the pattern information is recorded as the hologram in said spatial filter.

3. The chirp indicator according to claim 2,
wherein the pattern information is determined, using an optimization algorithm, in the following manner: modulating the phase so that a sharp peak is detected by said chirp quantity isolation unit in the case where the target ultrashort optical pulse is the ultrashort optical pulse used as a reference; and modulating the phase so that a sharp peak is not detected by said chirp quantity isolation unit in the case where the target ultrashort optical pulse is not the ultrashort optical pulse used as a reference.

4. The chirp indicator according to claim 3,
wherein a plurality of units of pattern information with differing chirp quantities are each recorded as holograms in said spatial filter, and
said chirp quantity isolation unit is operable to detect a chirp in the target ultrashort optical pulse for each unit of the pattern information and determine the chirp quantity of the target ultrashort optical pulse based on a composition ratio of each detected chirp.

5. The chirp indicator according to claim 4,
wherein a plurality of holograms is formed in parallel in said spatial filter, and
said chirp quantity isolation unit is operable to isolate the chirp quantity of target ultrashort optical pulses in parallel by detecting an optical correlation between the target ultrashort optical pulses and the ultrashort optical pulse used as a reference when the target ultrashort optical pulses are introduced into said spatial filter in parallel.

6. A measurement method for measuring chirp quantity of an ultrashort optical pulse, comprising:
determining the chirp quantity of a target ultrashort optical pulse when the target ultrashort optical pulse is introduced into a spatial filter in which a hologram is formed, the hologram having information of chirp quantity of an ultrashort optical pulse used as a reference recorded, and detecting an optical correlation between the target ultrashort optical pulse and the ultrashort optical pulse used as a reference.

* * * * *